(12) United States Patent
Lambert et al.

(10) Patent No.: US 10,145,100 B2
(45) Date of Patent: Dec. 4, 2018

(54) DAMP PROOF COURSE ARTICLE

(71) Applicant: Safeguard Europe Limited, Horsham, West Sussex (GB)

(72) Inventors: Hudson Lambert, Horsham (GB); Eric Rirsch, Horsham (GB); Jonathan Kirby, Horsham (GB)

(73) Assignee: Safeguard Europe Limited, Horsham, West Sussex (GB)

( * ) Notice: Subject to any disclaimer, the term of this patent is extended or adjusted under 35 U.S.C. 154(b) by 507 days.

(21) Appl. No.: 14/759,409

(22) PCT Filed: Jan. 6, 2014

(86) PCT No.: PCT/GB2014/050027
§ 371 (c)(1),
(2) Date: Jul. 7, 2015

(87) PCT Pub. No.: WO2014/106754
PCT Pub. Date: Jul. 10, 2014

(65) Prior Publication Data
US 2015/0345129 A1    Dec. 3, 2015

(30) Foreign Application Priority Data

Jan. 7, 2013  (GB) ................................ 1300233.2

(51) Int. Cl.
| | |
|---|---|
| *E04B 1/00* | (2006.01) |
| *B32B 37/00* | (2006.01) |
| *E04B 1/64* | (2006.01) |
| *B32B 37/18* | (2006.01) |
| *B32B 37/14* | (2006.01) |

(52) U.S. Cl.
CPC ............ *E04B 1/648* (2013.01); *B32B 37/142* (2013.01); *B32B 37/18* (2013.01); *E04B 1/644* (2013.01); *B32B 2419/00* (2013.01); *Y10T 156/1056* (2015.01); *Y10T 442/2213* (2015.04)

(58) Field of Classification Search
CPC  B04B 1/644; B04B 1/48; B04B 1/648; B32B 37/18; B32B 37/142; Y10T 156/1056
See application file for complete search history.

(56) References Cited

U.S. PATENT DOCUMENTS

| | | |
|---|---|---|
| 5,458,923 A | 10/1995 | Goebel et al. |
| 6,323,268 B1 | 11/2001 | Fisher |

(Continued)

FOREIGN PATENT DOCUMENTS

| | | | |
|---|---|---|---|
| GB | 1374611 | * | 11/1974 |
| GB | 001502322 A | * | 3/1978 |

(Continued)

OTHER PUBLICATIONS

European Patent Office, 4 pages, Application No. 14 701 818.9-1601, dated Jan. 2017 (Year: 2017).*

*Primary Examiner* — Linda L Gray
(74) *Attorney, Agent, or Firm* — patenttm.us

(57) ABSTRACT

A damp proof course article (20) for forming a damp proof course in a substrate (10) is disclosed. The damp proof course article comprises an absorbent member (22) and a damp proof course material absorbed into the absorbent member. The damp proof course material comprises an active agent, wherein the active agent comprises an alkoxysilane.

22 Claims, 9 Drawing Sheets

(56) References Cited

U.S. PATENT DOCUMENTS

| | | | |
|---|---|---|---|
| 6,610,782 B1 | 8/2003 | Weiland | |
| 2008/0188617 A1 | 8/2008 | Standke et al. | |
| 2012/0247363 A1* | 10/2012 | Lecomte | C04B 24/42 106/2 |
| 2014/0330035 A1* | 11/2014 | Ljesic | C04B 24/42 556/470 |

FOREIGN PATENT DOCUMENTS

| | | | |
|---|---|---|---|
| GB | 1502322 A | | 3/1978 |
| GB | 001514495 A | * | 6/1978 |
| GB | 2284442 A | | 6/1995 |
| GB | 2359548 A | | 8/2001 |
| GB | 2385880 A | | 9/2003 |
| GB | 2453851 A | | 4/2009 |
| WO | 95/16752 A1 | | 6/1995 |

\* cited by examiner

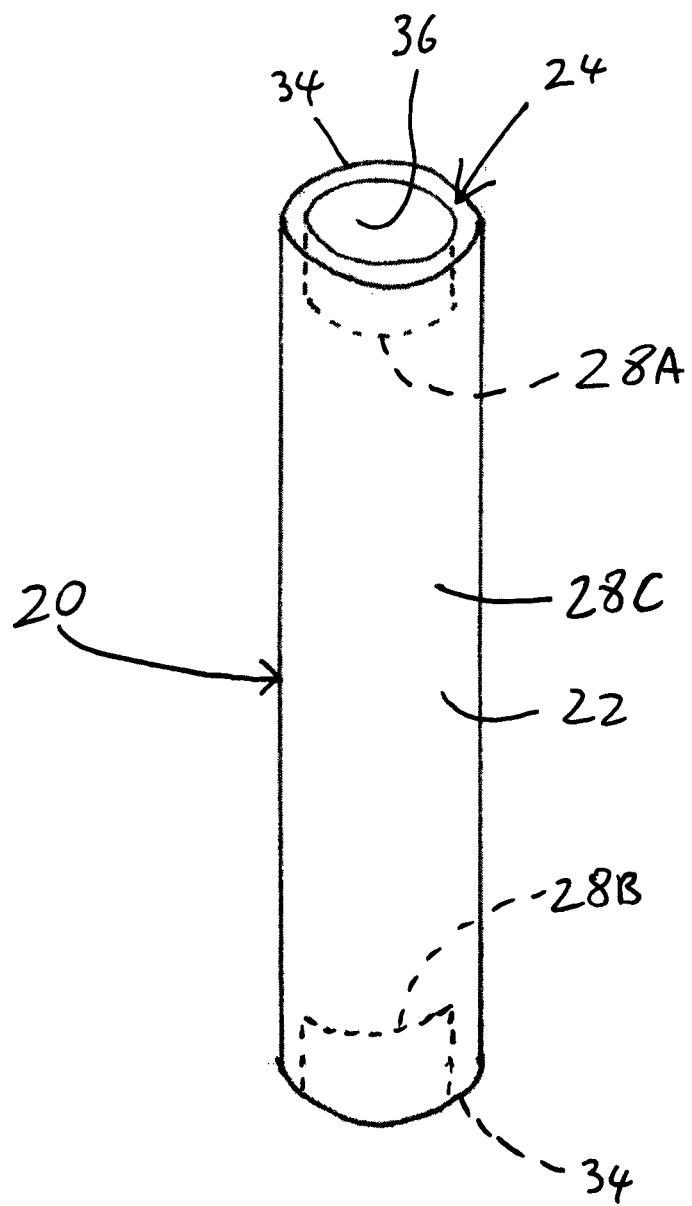

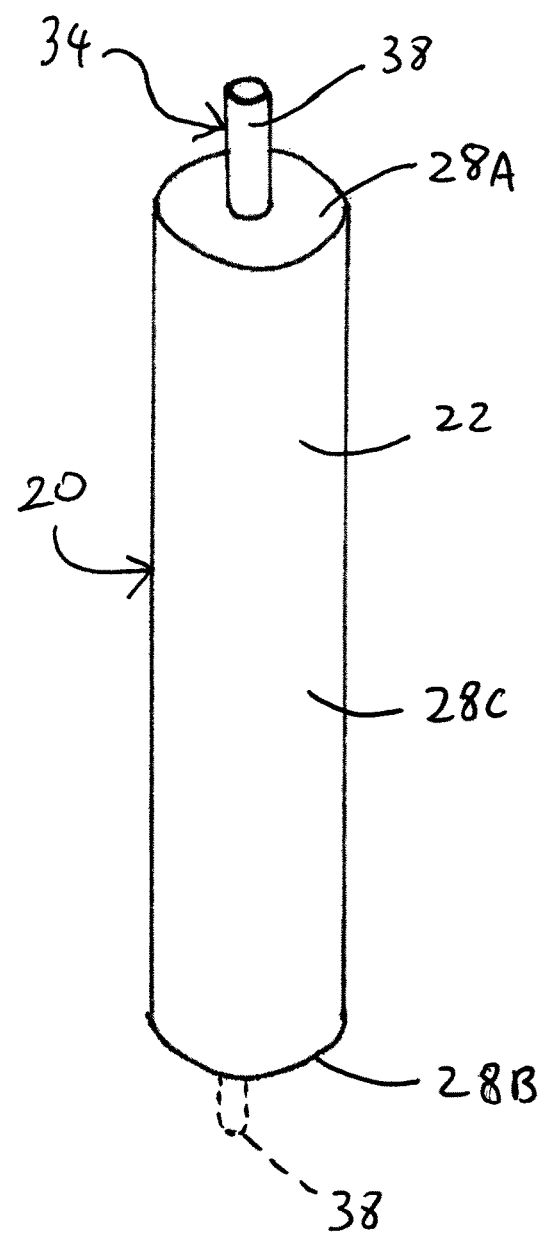

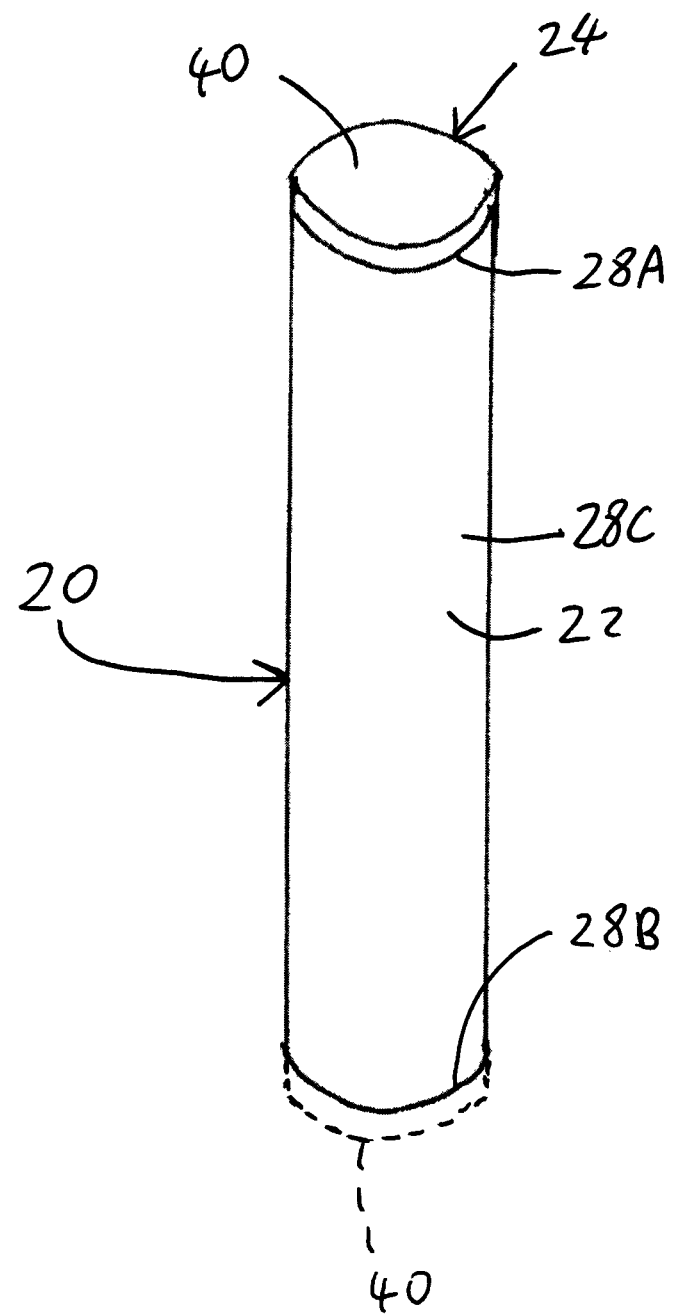

DAMP PROOF COURSE ARTICLE

This invention relates to damp proof course articles.

It is known to use chemicals to provide damp-proof courses in buildings. Such chemicals often comprise silicone, but the performance of such chemicals is limited.

According to one aspect of this invention, there is provided a damp proof course article for forming a damp proof course in a substrate, the damp proof course article comprising an absorbent member and damp proof course material absorbed into the absorbent member, the damp proof course material comprising an active agent, wherein the active agent comprises an alkoxysilane.

The damp proof course material may comprise between 20 wt. % and 100 wt. % of active agent. The damp-proof course material comprises between 30 wt. % and 100 wt. % of the active agent. The damp-proof course material may comprise between 25 wt. % and 50 wt. % of the active agent. The damp-proof course material may comprise between 30 wt. % and 50 wt. % of the active agent.

The active agent may comprise one or more alkoxysilanes selected from a propylalkoxysilane, a butylalkoxysilane, an octyltriethoxysilane, a dodecylalkoxysilane, and a hexadecylalkoxysilane. The active agent may comprise a combination of two or more of the aforesaid alkoxysilanes.

In one embodiment, the active agent may comprise a combination of octyltriethoxysilane and one or more selected from a propylalkoxysilane, a butylalkoxysilane, a dodecylalkoxysilane, and a hexadecylalkoxysilane. The active agent may comprise n-octyltriethoxysilane.

Alternatively, the active agent may comprise one or more alkoxysilanes selected from a propylalkoxysilane, a butylalkoxysilane, a dodecylalkoxysilane, and a hexadecylalkoxysilane. The active agent may comprise a combination of two or more of the aforesaid propylalkoxysilane, butylalkoxysilane, dodecylalkoxysilane, and hexadecylalkoxysilane.

The propylalkoxysilane may comprise one or more propyltrialkoxysilanes. The butylalkoxysilane may comprise one or more butyltrialkoxysilanes. In one embodiment, the alkoxysilane may comprise n-octyltriethoxysilane.

Desirably, the propylalkoxysilane comprises one or more selected from propyltrimethoxysilane and propyltriethoxysilane. Desirably, the butylalkoxysilane comprises one or more selected from butyltrimethoxysilane and butyltriethoxysilane.

The damp proof course material may comprise a non-reactive material. Desirably, the non-reactive material may comprise a material that is substantially unreactive with the material in which the damp proof course is to be formed, e.g. bricks, stone and/or mortar.

The damp proof course material may comprise up to 80 wt. % of the non-reactive material. The damp proof course material may comprise up to 50 wt. % of the non-reactive material. The damp proof course material may comprise substantially 65 wt. % of the non-reactive material. The damp proof course material may comprise between 50 wt. % and 75 wt. % of the non-reactive material. The damp proof course material may comprise between 60 wt. % and 70 wt. % of the non-reactive material. The non-reactive material may comprise an organic material. In one embodiment, the non-reactive material may comprise an organic solvent, such as ethanol or white spirit. The non-reactive material may comprise an inert organic carrier, which may comprise an inert organic solvent.

The absorbent member may be supplied by the company Filtrona Fibertech GmbH. The absorbent member may comprise a porous material. The absorbent member may comprise a polymeric material, desirably at least one polyolefin, such as polyethylene, polypropylene and/or polyester. Where the polymeric material comprises a mixture of polypropylene and polyethylene, the polypropylene and polyethylene may be present in the mixture in a ratio of substantially 1:1 w/w.

In one embodiment, the absorbent member may comprise a plurality of fibres formed from polyolefins. In another embodiment, the absorbent member may define a plurality of interconnected pores.

The absorbent member may have a density between 0.1 g/cm$^3$ and 0.6 g/cm$^3$. Desirably, the absorbent member has a density between 0.25 g/cm$^3$ and 0.35 g/cm$^3$. The absorbent member may have a density of 0.3 g/cm$^3$. The absorbent member may comprise a first part of a relatively higher density and second part of a relatively lower density.

The absorbent member may be elongate, and may have a length in the range of 50 mm to 500 mm. The absorbent member may have a length in the range of 80 mm to 500 mm. The absorbent member may have a substantially circular end profile, and may have a diameter in the range of 8 mm to 16 mm.

The absorbent member may be elongate and may be in the form of a rod, which may have a formation on the surface to assist disposing the absorbent member in the substrate and/or to facilitate the release of damp proof course material. The absorbent member may be any other shape, which may be a complex shape, to assist the disposing of the absorbent member in the substrate and/or to facilitate the release of the damp proof course material into the substrate.

The formation may be in the form of at least one groove extending lengthwise of the absorbent member. The groove may be defined in the outer surface of the absorbent member. Alternatively, the formation may be in the form of a projection on the surface of the absorbent member. The projection may comprise at least one nodule.

In one embodiment, the absorbent member may define at least one groove extending lengthwise thereof. The groove may be defined in the outer surface of the absorbent member. The absorbent member may define a plurality of the aforesaid grooves, each of which may extend lengthwise of the absorbent member. The cross-sectional end profile of the elongate member can vary from a circle to other shapes. The shape can influence the ease of insertion of the member into the drilled hole and the subsequent transfer of the active material from the member into the surrounding structure. In one embodiment, the absorbent member may have a cross-sectional end profile which is substantially the shape of a cog wheel.

The damp proof course article may include release control means for controlling release of the damp proof course material from at least one region of the absorbent member. The release control means may be provided on the surface of the absorbent member. The release control means may reduce the rate of release of the damp proof course material from at least one region of the surface of the absorbent member relative to regions of the surface devoid of the release control means.

The damp proof course article may comprise a plurality of release control means to reduce the surface porosity of a plurality regions of the absorbent member. The damp proof course article may include release control means for controlling release of the damp proof course material from opposite end regions of the absorbent member. The, or each, aforesaid region may comprise a surface region. The, or each, aforesaid region of the absorbent member may be an end region of the absorbent member.

The release control means may be provided at an end region of the absorbent member. Desirably, a plurality of release control means are provided at the end regions of the absorbent member. The absorbent member may have opposite end regions and a respective release control means may be provided at each opposite end region. The absorbent member may have a central region between the opposite end regions, wherein said central region is substantially devoid of the release control means.

In one embodiment, the, or each, release control means may comprise a release control region of the absorbent member. In one embodiment, the release control means may comprise a partially or substantially wholly melted end region of the absorbent member. The surface of the absorbent member may be subject to heating to effect at least partial melting thereof, for example by, for example, radiant, laser, conductive or ultrasonic heating.

Alternatively, or in addition, the, or each, release control means may comprise a sealant coating on the surface of an end region of the absorbent member. The sealant coating may be capable of restricting the diffusion of the damp proof course material from the absorbent member. The sealant coating may comprise a wax coating. Alternatively, the sealant coating may comprise an adhesive coating.

In another embodiment, the, or each, release control means may comprise a release control member secured at an end region of the absorbent member. One of the release control members may be disposed at each end of the absorbent member. The, or each, release control member may be substantially impermeable to the damp proof course material. With the use of the release control member, it is convenient to use a substantially cylindrical absorbent member. In one embodiment, the, or each, release control member may comprise an end cap.

The, or each, release control means may comprise a securing means on the release control member to secure the release control member to the absorbent member. The, or each, securing means may comprise a pin or a collar to cooperate with the absorbent member. Where the securing means comprises a pin, the pin may be capable of insertion into the absorbent member. Alternatively, where the securing means may comprise a collar, the collar may engage around the end region of the absorbent member. Alternatively, the securing means may comprise an adhesive.

In a further embodiment, the, or each, release control means may comprise a spacing means to prevent contact between the end of absorbent member and the end of the drilled hole in which it is inserted. The spacing means may be elongate.

In one embodiment, the spacing means may comprise an elongate projecting member, which may be cylindrical or other suitable shape. The projecting member may comprise a spike. The projecting member may project from the end region of the absorbent member, and may extend along the main axis thereof.

Alternatively, the spacing means may comprise an annular projecting member, which may extend axially from the end region of the absorbent member. The annular member may have a cylindrical configuration defining a central space, which space may be cylindrical or other suitable shape.

Although the release control means may be advantageous for any absorbent member, an example of where such sealing to reduce porosity may be particularly beneficial is in the case of a fibrous absorbent member having directional fibre alignment and non-uniform porosity, for example, an absorbent member manufactured by Filtrona Fibertech GmbH. In such a situation, the opposite ends of the absorbent member have increased flow rate of active material when placed in equal surface contact with the mineral substrate e.g. brick or mortar.

The described embodiments of the present invention provide the advantage that the provision of a release control means at the ends of the absorbent member prevent disproportionate release of the damp proof course material.

In a further aspect of the invention there is provided a method of disposing an absorbent member described above in a substrate, said method comprising drilling a hole in the substrate, removing debris from the drilled hole, and thereafter inserting the absorbent member into the drilled hole.

It is beneficial to have close contact between the rod and the side of the drilled hole to facilitate the consistent release of the damp proof course material. It is desirable for the drilled hole and the absorbent member to be the same or similar in diameter.

It has been found that removal of the drilling debris prior to insertion of the absorbent member is particularly desirable but difficult to achieve. Insertion of the absorbent member can dislodge matter from the side of the hole. As a result, it can be difficult to position the absorbent member correctly in the hole. This effect is dependent on the composition of the substrate but is a drawback in substrates in the form of damp walls.

The method may comprise providing a drilling member having a head comprising four cutting formations, which may be arranged in a cross formation. The drilling member may be, for example, a 4-cutter. The use of such drilling members is particularly suitable for drilling into substrates in the form of damp walls. Suitable such drilling members are available from Alpen Maykestag GmbH.

In the embodiment described herein, a drilling member having no more than two cutting members may be used. Such a drilling member may be a 2-cutter.

Embodiments of the invention will now be described by way of example only, with reference to the accompanying drawings, in which:

FIGS. 4 to 9 show further damp proof course articles having release control means.

Figure 1:
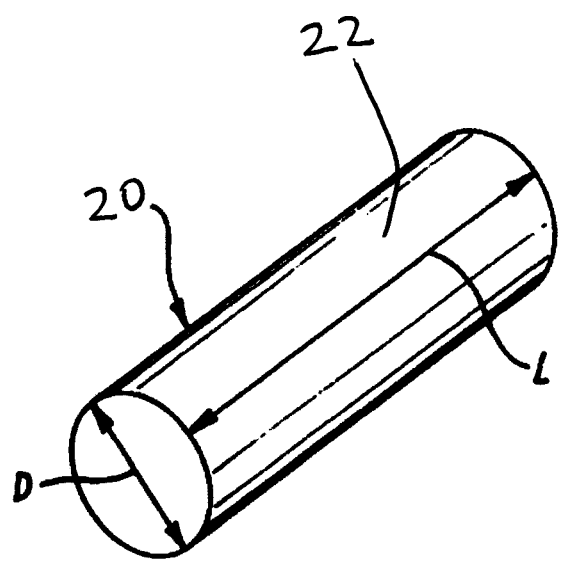
FIG. 1 shows a damp proof course article.

Referring to FIG. 1, a damp proof course article 20 is shown. The damp proof course article 20 is inserted into a drilled hole in a substrate, for example a wall of a building.

The damp proof course article 20 comprises an absorbent member in the form of a substantially cylindrical plug 22 formed of an absorbent material. The plug has a diameter D of substantially 12 mm, and a length L of substantially 220 mm. The length of the plug can be selected to correspond with the thickness of the wall requiring treatment. A length of 180 mm is typical.

When selecting the length of the elongate cylindrical plug 22, it is advisable for the plug 22 to be shorter than the width of the wall. This is because when drilling with a hammer action power drill, some force is exerted on the advancing drill bit which can cause the brick and mortar at the rear of the wall to rupture. Additionally allowance should be made for finishing the formed hole with matching mortar or end cap once the damp proof course article 20 has been inserted.

The length of the plug 22 can be between 80% and 85% of the thickness of the wall. For example, if a wall of thickness 215 mm is treated, then a suitable length of the plug 22 is approximately 180 mm. Alternatively a plurality of shorter plugs 22 can be inserted into each drilled hole.

Each plug 22 is formed of fibres based on a polyolefin, such as polyethylene. The fibrous plugs 22 have a density of substantially 0.3 g/cm³. Suitable plugs 22 are available from the company Filtrona Fibertech GmbH.

Other suitable plugs 22 formed of polymers, and having a porosity of 59% and 35% by volume, are sold under the trade mark VYON by the company Porvair. The use of material formed from polymers such as material sold under the trade mark VYON has the advantage in the embodiments described herein that the material has uniform porosity and can be produced by injection moulding into the desired shape.

A damp proof course material comprising an active agent capable of forming a damp proof course in a building wall is absorbed onto the porous structure forming the plug 22.

In one embodiment, the active agent comprises at least one selected from a propylalkoxysilane and a butylalkoxysilane. In one example, the active agent may comprise a mixture of a propylalkoxysilane and a butylalkoxysilane.

In another embodiment, the active agent comprises at least one selected from a propylalkoxysilane a butylalkoxysilane and an octyltriethoxysilane. For example, the active agent may comprise and a mixture comprising octyltriethoxysilane, with a propylalkoxysilane and/or a butylalkoxysilane.

The damp proof course article 20 can be formed by providing the plugs 22, into which the active agent is absorbed. Where the active agent comprises one or more of a propylalkoxysilane and a butylalkoxysilane, the propylalkoxysilane may be propyltrimethoxysilane and/or propyltriethoxysilane, and the butylalkoxysilane may be butyltrimethoxysilane and/or butyltriethoxysilane.

A testing method was carried out to test the performance in forming a damp proof course of each of the active agents set out in the tables below. The method for testing the above active agents comprised the following steps.

Figure 2:
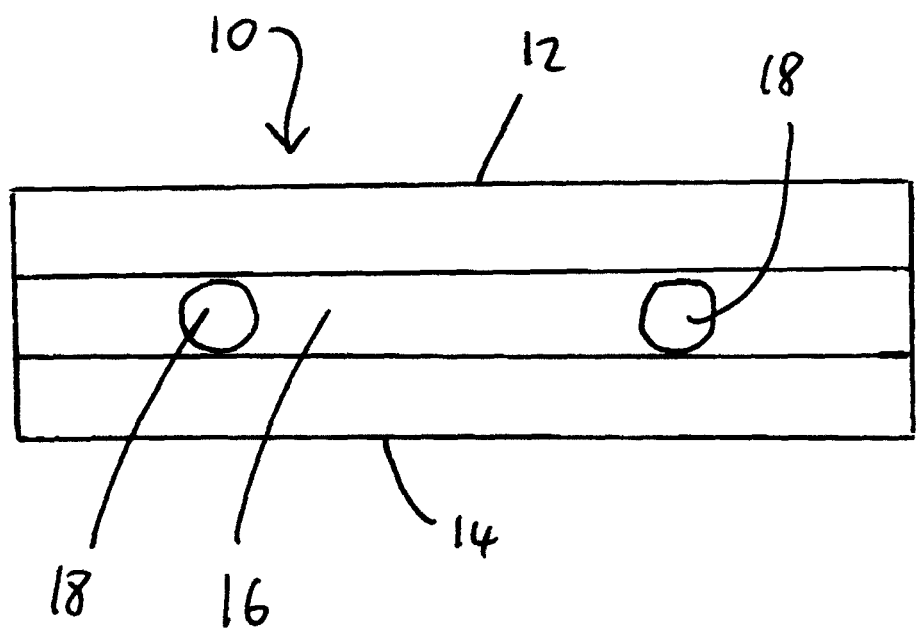
FIG. 2 is a front view of a brick testing sample.
Figure 3:
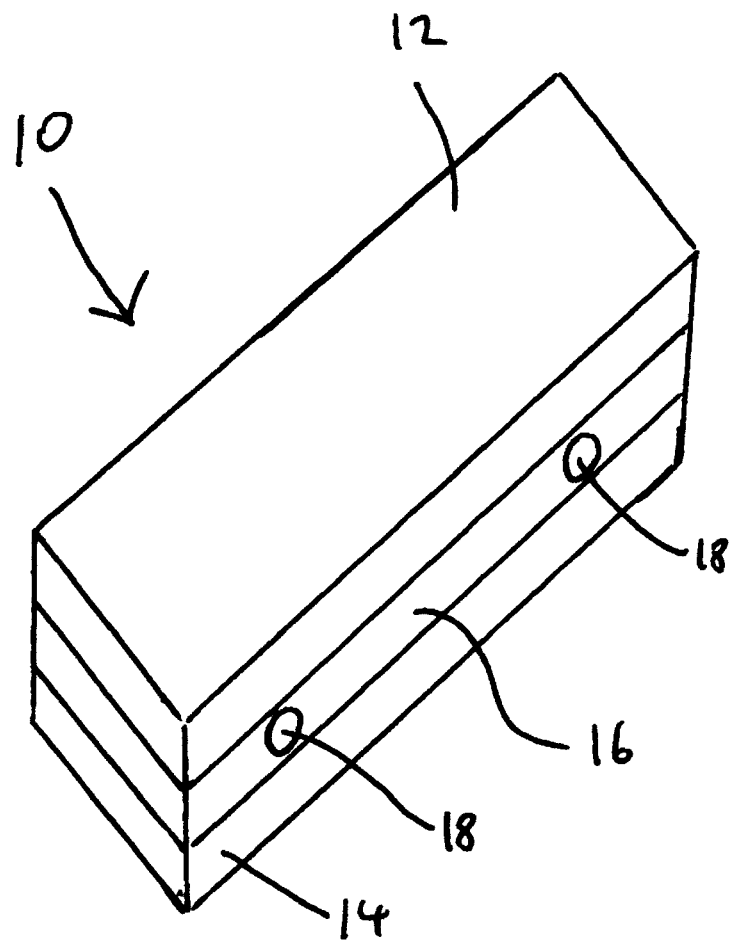
FIG. 3 is a top perspective view of the brick testing sample.

Referring to FIGS. 2 and 3, a plurality of brick testing samples 10 were produced, each testing sample being formed from two Fletton brick strips 12, 14 provided by Hanson Brick Limited. Each strip had dimensions of 215 mm×65 mm×20 mm. The strips 12, 14 were adhered to each other using lime-free mortar 16 having dimensions of 215 mm×65 mm×15 mm.

The testing samples were initially left at ambient temperature for two days, and then dried in an oven for two days at approximately 40° C.

After drying, two holes 18 having a diameter of 10 mm and a length of 50 mm were drilled into the mortar 16 of each brick testing sample 10, the holes being spaced from each other by approximately 120 mm centre to centre.

A plurality of the plugs 22, devoid of any damp proof course material, were provided and weighed. A plurality of the damp proof course articles 20 were formed using the weighed plugs. Each of the damp proof course material was absorbed into a respective plurality of the plugs 22 to form the damp proof course articles 20.

The damp proof course articles 20 so formed were then weighed following insertion into the damp proof course material, so that the weight of the respective active agent absorbed into each plug 22 is known. All of the aforesaid weights were recorded.

A first series of tests were carried out in a dry condition, i.e. the damp proof course articles were place disposed in the holes 18 in dry brick testing samples 10.

A period of dispersion and cure of the active agent then followed over 28 days after which the water resistance of the treated brick testing samples 10 was measured by placing the treated brick testing samples 10 in a shallow tray containing water at a depth of substantially 5 mm thereby allowing the water to penetrate the brick testing samples 10.

The results of the first series of tests are shown in Table 1.

TABLE 1

Dry Test A

| Brick Testing Sample | Weight gain after 7 days on contact with water (% increase) | Weight of water absorbed in grams* |
| --- | --- | --- |
| Untreated (control) | 18.0 | 216 |
| Octyltriethoxysilane | 2.9 | 35 |
| Propyltriethoxysilane | 0.4 | 5 |
| Butyltriethoxysilane | 0.5 | 6 |

*Initial weight of each brick testing sample was substantially 1200 grams

The results shown in Table 1 demonstrate a significant improvement in performance in the dry test conditions when using propyltriethoxysilane and butyltriethoxysilane over the untreated control and octyltriethoxysilane.

In a second series of tests, each brick testing sample 10 was weighed and the maximum saturation determined by complete immersion in water of the brick testing samples 10. The brick testing samples 10 were then allowed to dry, so that each brick testing sample 10 contains water at substantially 50 wt % of its maximum saturation.

The damp proof course articles 20 were then inserted into the holes 18 drilled into the mortar 16 in the brick testing samples 10, so that each brick testing sample 10 held two damp proof course articles 20. Both damp proof course articles 20 in each brick testing sample 10 contain the same active agent, but the damp proof course articles 20 in different brick testing samples 10 contain different active agents.

The brick testing samples 10 were then sealed and stored for a period of 28 days at constant humidity and at substantially 20° C. Thus allowing sufficient time for the active agents in the plugs 22 to migrate and be absorbed into the bricks 12, 14.

At the end of the 28 day period, each brick testing sample 10 was then weighed, and the weight of each brick testing sample 10 was recorded.

Each brick testing sample 10 was then disposed in a tray containing water having a depth 5 mm. The brick testing samples 10 were left in sealed boxes in contact with the water for a period of 28 days. The brick testing samples 10 were weighed periodically to ascertain the weight of water absorbed into the brick testing samples 10, and the weights so measured were recorded.

The results of the second series of tests are shown in Table 2.

TABLE 2

Semi-saturated Test

| Brick Testing Sample | Weight of water absorbed in grams* |
| --- | --- |
| Untreated sample | 65 |
| Untreated sample with plug but without active material | 70 |

TABLE 2-continued

Semi-saturated Test

| Brick Testing Sample | Weight of water absorbed in grams* |
|---|---|
| Octyltrimethoxysilane | 35 |
| Octyltriethoxysilane | 39 |
| Propyltrimethoxysilane | 9 |
| Propyltriethoxysilane | 8 |
| Butyltrimethoxysilane | 2 |
| Propyltrimethoxysilane and octyltriethoxysilane at 1:1 weight ratio | 9 |

*Initial weight of each brick testing sample was substantially 1300 grams

The results demonstrate that the propylalkoxysilanes and the butylalkoxysilanes reduce the amount of water absorption in comparison to the untreated brick testing samples 10 and in comparison to brick testing samples treated with octyltriethoxysilane.

In a third series of tests, the procedure described in the first series was followed with the exception that hydraulic lime was included in the mortar used in the formation of the brick testing samples 10, thereby providing high alkalinity.

The extent of water absorption after 7 days is shown in Table 3.

TABLE 3

Dry Test B

| Brick Testing Sample | Weight of water absorbed in grams* |
|---|---|
| Untreated (control) | 240 |
| Octyltriethoxysilane | 173 |
| Propyltriethoxysilane | 126 |
| Butyltriethoxysilane | 138 |
| Butyltriethoxysilane and octyltriethoxysilane at 1:1 weight ratio | 74 |

*Initial weight of each brick testing sample was substantially 1200 grams

The combination of butyltriethoxysilane and octyltriethoxysilane at 1:1 weight ratio is shown by Table 3 to be particularly effective at this test condition.

It is clear from the above results that the propylalkoxysilanes and the butylalkoxysilanes show a significant improvement over the other active agents tested. This improvement manifests itself in a greater migration of the active agent from the damp proof course article 20 to the brick testing sample 10. The improvement is also demonstrated by a better prevention of the absorption of water into the brick testing samples 10.

Therefore, it can be concluded from this that the use of a damp proof course article which comprises an absorbent member and an active agent comprising a propylalkoxysilane or a butylalkoxysilane is a significant improvement over prior art damp proof course articles.

In the above described embodiments, the damp proof course material consists of 100 wt. % of the alkoxysilane active material. In other embodiments, the damp proof course material comprises a non-reactive material, which is substantially non-reactive with the substrate in which the damp proof course is formed. The non-reactive material may be an organic solvent, which is conveniently ethanol or a hydrocarbon based solvent such as white spirit.

In the present embodiments, the substrate comprises bricks and/or mortar. The substrate may comprise a wall, which may be a wall of a building.

The non-reactive material can assist in the transfer of the active material into the porous structure of the substrate by increasing diffusion or reducing the reaction rate of the active material with the substrate. Table 4 shows the increased efficiency of waterproofing from adding a non-reactive material.

Fibre plugs 22 containing active and non-reactive material at different combinations were inserted into drilled holes in a lime mortar and left for 7 days for hydrophobisation to occur. At the end of the period, the mortar blocks were tested with water and the reduction in water absorption measured.

TABLE 4

| Material mixture | % water absorption resistance per gram of active material used |
|---|---|
| n-octyl triethoxysilane | 2.7 |
| n-octyl triethoxysilane + ethanol (1:1 wt/wt) | 4.4 |
| n-octyl triethoxysilane + white spirit (1:1 wt/wt) | 5.3 |
| n-octyl triethoxysilane + white spirit (1:2 wt/wt) | 7.3 |

(Note: Untreated control at 18 wt % water absorption)

Although the damp proof course article 20 shown in FIG. 1 has been described as being used in testing, it will be appreciated that it is suitable for use in an external wall of a building to create a damp proof course therein. In such use, a plurality of holes are drilled into a wall in which the damp proof course is to be created.

The damp proof course article can be used for treating building materials of different types including; mortar, brick, concrete, wood, dried mud and natural stones.

In the case of mortar, the holes are drilled into the masonry, such as into a horizontal mortar course in the wall at substantially the same height above ground level as each other, for example about 0.1 metre or following the line of a mortar course between brick courses. Each hole is spaced from adjacent holes by a distance of substantially 60 to 140 mm, such as 120 mm.

Where the plugs 22 have smaller diameters, the spacing between adjacent holes can be below 60 mm as appropriate. The spacing between adjacent holes is selected to allow sufficient active agent to diffuse between the drilled holes.

Although the procedure described above involves the drilling of holes into a horizontal mortar course, it will be appreciated by the skilled person that the holes could be drilled in any other suitable regions of the wall, such as in vertical mortar course, or into the brickwork or stonework.

It will also be appreciated by the skilled person that the holes do not need to be drilled horizontally into the wall, but can be drilled therein at any suitable angle.

A respective damp proof course article 20 is inserted into each of the holes. Once so inserted, the active agent, for example propyltriethoxysilane, in each of the damp proof course articles 20 then disperses into the wall to form the damp proof course.

The damp proof course articles 20 formed for use in walls in a building can be made in the same way as the damp proof course articles 20 used in the testing described above.

The density of the plug 22 has been selected to provide the optimal performance. Table 5 shows the percentage saturation of a brick testing sample 10 using plugs 22 of different densities formed of polyolefin fibres.

TABLE 5

Plug Density

| Density of plug g/cm³ | Amount of silane absorbed (g/cm length of 10 mm diameter plug) | Insertion Test Result | Weight of water absorbed in grams* |
|---|---|---|---|
| 0.2 | 0.54 | Fail | 20 |
| 0.3 | 0.44 | Pass | 9 |
| 0.4 | 0.33 | Pass | No data |
| 0.5 | 0.24 | Pass | No data |

*Semi-wet test with propyltrimethoxysilane active material

It is believed that the degree of contact of the plug 22 with the drilled hole can influence the transfer of the active agent to the wall. In order to maintain good contact the diameter of the drilled hole should be the same, slightly smaller or slightly larger than the plug 22.

In the insertion test, a 10 mm diameter plug 22 containing the active agent was inserted into horizontal holes drilled into the mortar using a 10 mm diameter drill bit. The ease of insertion was assessed by manually inserting the plug into the hole. This is an important feature to the operative installing the damp proof article.

The lower density plug at 0.2 g/cm³ failed to be inserted, whereas the plugs 22 having densities of 0.3, 0.4 and 0.5 g/cm³ respectively were easily inserted. While not intending to be limited to a particular theory, it is believed that an explanation for this is that the plug 22 having a density of 0.2 g/cm³ has an insufficient flexural modulus to be inserted into such a close-fitting hole. Higher density plugs can be easily inserted but absorb less of the active agent than lower density plugs.

Table 5 above reveals that a plug 22 having a density of 0.3 g/cm³ provides an optimum compromise between density and absorbability for 10 and 12 mm diameter plugs. It is also noted from Table 5 that, although a greater amount of active material was contained in the lowest density plug, this did not result in improved water proofing performance.

Referring to FIGS. 4 to 8, it can be beneficial to reduce the surface porosity of the plug 22 at desired regions thereof by the provision of release control means 24 at the end regions of the plug 22. In the embodiments described herein, the provision of the release control means 24 at the end regions of the plug 22 reduces the rate of release of the active material at those regions relative to the rate of release of the active material from other regions of the plug 22. This can be particularly beneficial with plugs 22 showing directionality of porosity, for example, porous fibrous rods supplied by Filtrona. The cut ends of such plugs 22 facilitate release of the active material resulting from the directionality of the fibres.

As can be seen from the drawings, the release control means 24 is provided at an end region 28A of the plug 22. The hole drilled in the wall can be a blind hole having a blind end. When the damp proof course article 20 is inserted into the hole in the wall, the release control means 24 abuts against the blind end. The provision of the release control means 24 has the effect of reducing the amount of the damp proof course material released via the end region 28A of the plug 22.

Without the release control means, the end region 28A of the plug 22 can abut against the blind end of the hole in the wall. A consequence of this is that a large proportion of the damp proof course material is released via the end region 28A, resulting in proportionately less of the damp proof course material being released into the main region of the wall.

Figure 4:
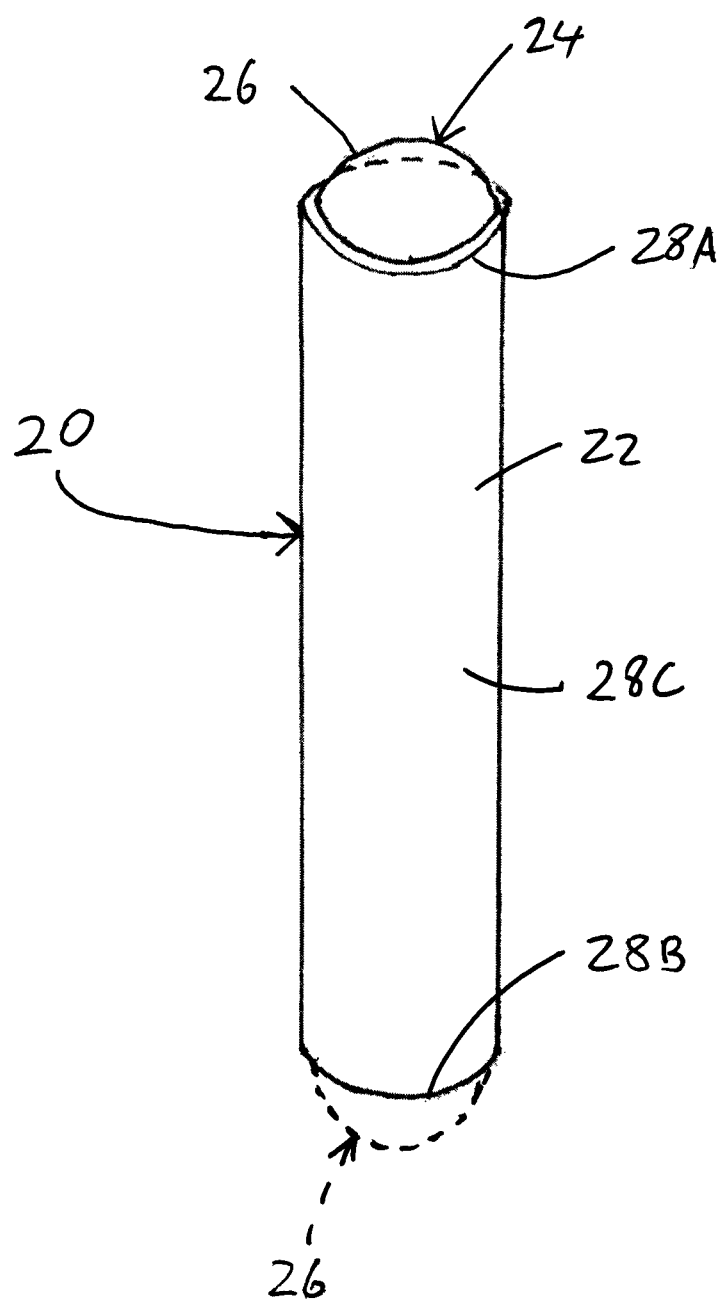

In the embodiment shown in FIG. 4, the release control means 24 comprises a first release control member 26 having a domed configuration. Alternatively, the release control member 26 may have a conical or other suitable configuration. The first release control member 26 is provided at the end region 28A of the plug 22, and is in the form of an end cap secured to the end region 28A of the plug 22. The release control member 26 is secured to the end region 28A of the plug 22, for example, by a projecting pin on the release control member 26 inserted into the plug 22 via the end region 28A. Alternatively, the release control member 26 may be secured to the end region 28A of the plug 22 by an adhesive.

Figure 5:
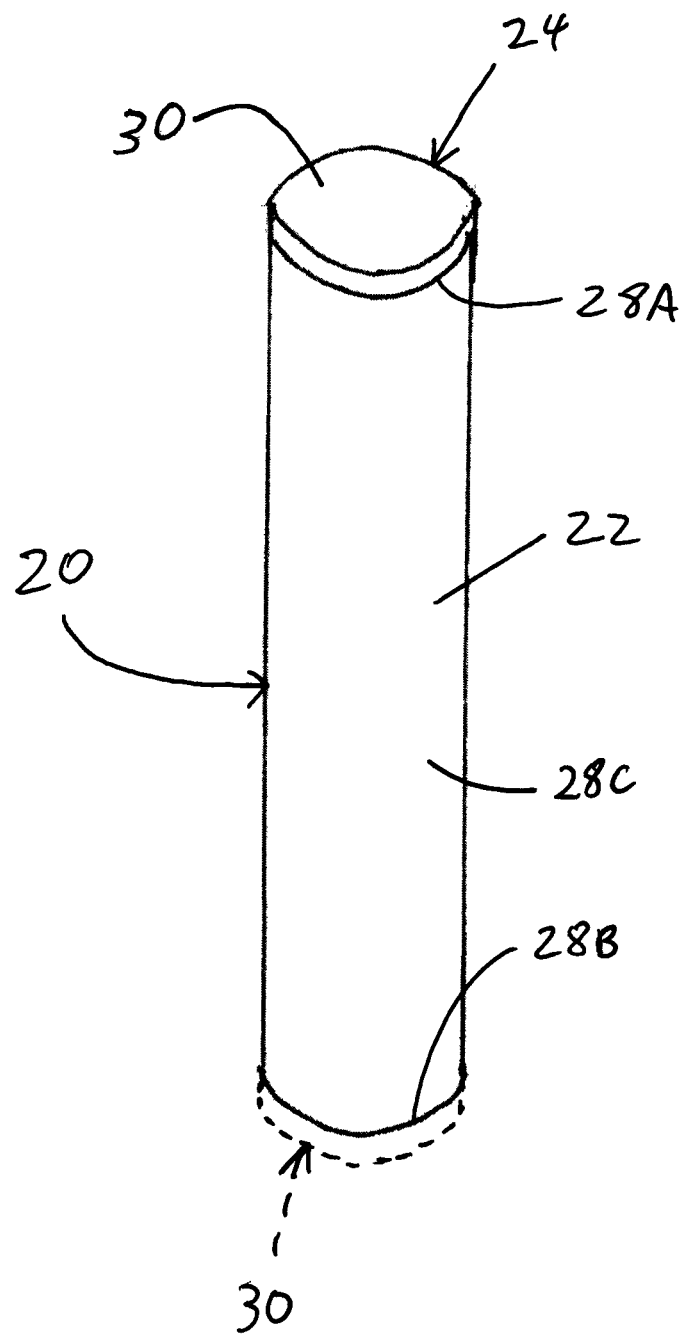

FIG. 5 shows a further embodiment, similar to the embodiment shown in FIG. 4. However, in FIG. 5, the release control means 24 comprises a second release control member 30, which is in the form of a disc shaped end cap having substantially the same diameter as the plug 22. The second release control member 30 is secured to the plug 22 in the same way as the release control member 26. In FIG. 5, the release control portion 30 has a diameter that is substantially equal to the diameter of the plug 22.

Figure 6:
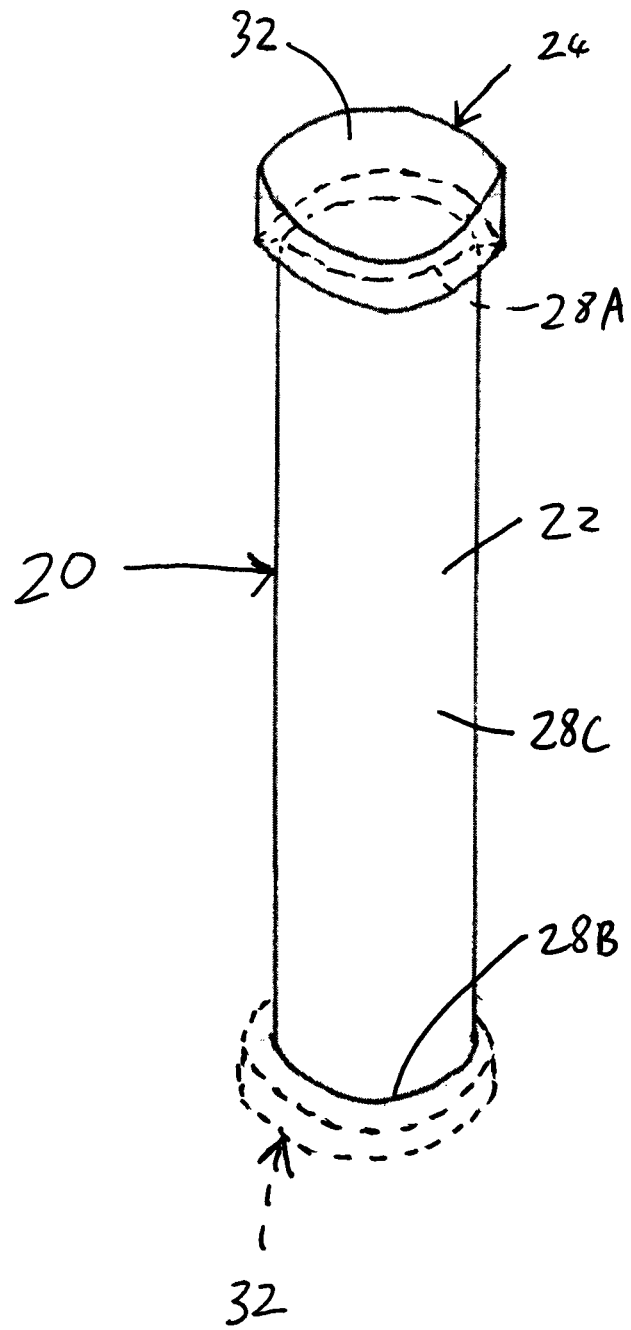

In FIG. 6, a yet further embodiment is shown, in which the release control means 24 comprises a third release control member 32 in the form of a further disc shaped end cap having a diameter that is larger than the diameter of the plug 22. This allows the third release control member 32 to engage the side of the whole in which the damp proof course article 20 is inserted, thereby holding the damp proof course article 20 in the hole.

In each of the embodiments shown in FIGS. 4, 5 and 6, the first, second and third release control members 26, 30, 32 are in the form of separate end caps secured to the plug 22. The release control members 26, 30, 32 can be formed of any material, such as a plastics material, which is impermeable to the damp proof course material.

FIGS. 7 and 8 show damp proof course articles 20 with alternative release control means 24. In FIG. 7, the release control means 24 comprises a spacing means 34 in the form of an annular member 34 extending axially from the end region 28A of the plug 22. The annular member 34 has a cylindrical configuration having a central space 36.

The annular member 34 could be formed from the plug 22, for example by removing the absorbent material to form the central space 36. Alternatively, the annular member 34 could be in the form of a separate member mounted on the end region 28A of the plug 22.

FIG. 8 shows a further spacing means 34 in the form of a substantially cylindrical spike 38 projecting from the end region 28A along the main axis of the plug 22. The pike 38 could be formed from the plug 22 by removing absorbent material from around the spike 38. Alternatively, the spike 38 could be in the form of a separate member mounted on the end region 28A of the plug 22.

Alternatively, the release control members 26, 30, 32, the annular member 34 and the spike 38 could be in the form of melted or partially melted end regions of the plug 22, which are shaped into the configurations of the release control members 26, 30, 32, the annular member 34 or the spike 38.

Where the release control members 26, 30, 32, the annular member 34 and the spike 38 comprise melted end regions of the plug 22, such melting may be effected, for example, by the application of radiant, laser, conductive or ultrasonic heat resulting in localised melting of surface of the plug 22.

FIG. 9 shows a further embodiment, in which the release control means comprises a sealant coating 40 on the end region 28A of the plug 22. The sealant coating 40 is impermeable to the damp proof course material and can be a wax or an adhesive which restricts the diffusion of the active material.

A test method to establish suitability of the sealant is to apply the sealant coating to the ends of the plug 22 at a coverage rate of 400 mg/mm$^2$ and soak the sealed end of the member in a mixture which comprises substantially 50/50 wt/wt of propyltriethoxyilane/n-octyltriethoxysilane for 14 days. The results from running this test with different sealant coatings are shown in Table 6.

TABLE 6

| Sealant Coating and Supplier | Result |
| --- | --- |
| Wax 150/155 - Poth Hille | Good bond and no dissolution |
| Wax 3691 - Poth Hille | Dissolved in active materials |
| Kerax Kw1301 - Kerax | Good bond and no dissolution |

The results shown in Table 6 demonstrate that particular sealant coatings provide significant advantages in end sealing when used with polyolefin fibre plugs 22 containing suitable active materials.

The embodiments shown in FIGS. 4 to 9 possess the release control members 26, 30, 32, the annular member 34 or the spike 38 at only one end region 28A. The release damp proof course article 20 may also have release control members 26, 30, 32, an annular member 34 or a spike 38 at the opposite end region, designated 28B, of each embodiment, as shown in FIGS. 4 to 9. The release control members 26, 30, 32, the annular member 34 and the spike 38 at the opposite end region 28B are represented by broken lines in FIGS. 4 to 9. A central region 28C of the plug 22 is provided between the end region 28A and the opposite end region 28B.

It is desirable for the hole drilled in the wall for insertion of the plug 22 to have the same, or a similar, diameter as the plug 22. This provides close contact between the plug 22 and the side of the drilled hole, thereby facilitating substantially constant release of the damp proof course material.

However, the insertion of the plug 22 into the drilled hole can dislodge drilling debris from the side of the hole, thereby making it difficult to correctly position the plug 22 in the drilled hole. This can be important where damp walls are treated.

It has been found that the above problem can be overcome by using a drilling member, in the form of a drill bit, having four cutting formations to form the hole. Such a drilling member may comprise a head having a cross-shape, and may comprise a 4-cutter. Suitable such drilling members are available from Alpen Maykestag GmbH and are particularly suitable when drilling into damp walls.

The above problem can also be overcome by using a drilling member having no more than two cutting formations, for example a 2-cutter SDS drill bits. The use of such a cutter may require repeat drilling to remove debris. In such circumstances, further cleaning of the hole with additional tools may be required.

There are thus described embodiments of a damp proof course article that provide an improved ability to form a chemical damp proof course in a wall as compared to prior art damp proof course articles.

A further advantage of the above described embodiments of the damp proof course article is that, using the above described techniques, repeat treatments can be easily carried out. Water based silane/siloxane creams, for example as disclosed in EP 1106590 cannot be applied twice into the same hole. This is because once the first treatment has been undertaken the sides of the hole become water repellent and any subsequent treatment with a water based composition is ineffective due to the hydrophobic character of the surface. The above described embodiments of the present invention do not suffer from this disadvantage.

Various modifications can be made without departing from the scope of the invention. For example, the absorbent member may define a plurality of the aforesaid grooves extending lengthwise of the absorbent member, such that the absorbent member has a cross-sectional end profile which is substantially the shape of a cog wheel.

The invention claimed is:

1. A damp proof course article for forming a damp proof course in a substrate, the damp proof course article comprising an absorbent member and a damp proof course material absorbed into the absorbent member, the damp proof course material comprising an active agent, wherein the active agent comprises a combination of an octyltriethoxysilane and one or more selected from a propyltrimethoxysilane, propyltriethoxysilane and butyltriethoxysilane.

2. A damp proof course article according to claim 1, wherein the damp proof course material comprises between 20 wt. % and 100 wt. % of the active agent.

3. A damp proof course article according to claim 1, wherein the octyltriethoxysilane comprises n-octyltriethoxysilane.

4. A damp proof course article according to claim 1, wherein the active agent comprises a combination of an octyltriethoxysilane with two or more of the aforesaid propyltrimethoxysilane, propyltriethoxysilane and butyltriethoxysilane.

5. A damp proof course article according to claim 1, wherein the damp proof course material comprises an inert organic carrier for the active agent, said carrier being substantially unreactive with the substrate.

6. A damp proof course article according to claim 5, wherein the inert organic carrier comprises an organic solvent.

7. A damp proof course article according to claim 1, wherein the absorbent member comprises a plurality of interconnected pores.

8. A damp proof course article according to claim 7, wherein the absorbent member comprises a porous polymeric material.

9. A damp proof course article according to claim 7, wherein the absorbent member comprises a plurality of fibres.

10. A damp proof course article according to claim 1, wherein the absorbent member has a density between 0.1 g/cm$^3$ and 0.6 g/cm$^3$.

11. A damp proof course article according to claim 1, wherein the absorbent member has a density between 0.25 g/cm$^3$ and 0.35 g/cm$^3$.

12. A damp proof course article according to claim 1, wherein the absorbent member has a formation on or in the outer surface of the absorbent member, said formation being provided to facilitate disposing the absorbent member in a hole in the substrate and/or to facilitate release of the active agent into the substrate.

13. A damp proof course article for forming a damp proof course in a substrate, the damp proof course article comprising an absorbent member and a damp proof course material absorbed into the absorbent member, the damp proof course material comprising an active agent, wherein the active agent comprises a combination of an octyltriethoxysilane and one or more of an alkoxysilane selected from a propylalkoxysilane, a butylalkoxysilane, a dodecylalkoxysilane, and a hexadecylalkoxysilane, wherein the absorbent member has a formation on or in the outer surface of the absorbent member, said formation being provided to facilitate disposing the absorbent member in a hole in the substrate and/or to facilitate release of the active agent into the substrate, and wherein the formation is in the form of at least one groove extending lengthwise of the absorbent member, the groove being defined in the outer surface of the absorbent member.

14. A damp proof course article according to claim 12, wherein the formation is in the form of a projection on the surface of the absorbent member, the projection comprising at least one nodule.

15. A damp proof course article according to claim 1, including release control means for controlling release of the damp proof course material from the absorbent member.

16. A damp proof course article according to claim 15, wherein the release control means reduces the surface porosity of at least one region of the absorbent member relative to the porosity of the remainder of the absorbent member.

17. A damp proof course article according to claim 16, wherein the aforesaid region of the absorbent member comprises an end region of the absorbent member.

18. A damp proof course article according to claim 15, comprising a plurality of the release control means to reduce the surface porosity of a plurality of regions of the absorbent member relative to the porosity of the remainder of the absorbent member.

19. A damp proof course article for forming a damp proof course in a substrate, the damp proof course article comprising an absorbent member and a damp proof course material absorbed into the absorbent member, the damp proof course material comprising an active agent, wherein the active agent comprises a combination of an octyltriethoxysilane and one or more of an alkoxysilane selected from a propylalkoxysilane, a butylalkoxysilane, a dodecylalkoxysilane, and a hexadecylalkoxysilane, including release control means for controlling release of the damp proof course material from the absorbent member, wherein the release control means reduces the surface porosity of at least one region of the absorbent member relative to the porosity of the remainder of the absorbent member, and wherein the release control means comprises an at least partially melted region of the absorbent member to reduce the porosity thereof.

20. A damp proof course article for forming a damp proof course in a substrate, the damp proof course article comprising an absorbent member and a damp proof course material absorbed into the absorbent member, the damp proof course material comprising an active agent, wherein the active agent comprises a combination of an octyltriethoxysilane and one or more of an alkoxysilane selected from a propylalkoxysilane, a butylalkoxysilane, a dodecylalkoxysilane, and a hexadecylalkoxysilane, including release control means for controlling release of the damp proof course material from the absorbent member, wherein the release control means reduces the surface porosity of at least one region of the absorbent member relative to the porosity of the remainder of the absorbent member, and wherein the release control means comprises a sealant coating on the, or each, region of the absorbent member, said sealant coating being capable of restricting the diffusion of the damp proof course material from the absorbent member.

21. A damp proof course article according to claim 16, wherein the release control means comprises a release control member provided on the, or each, region of the absorbent member, wherein the release control member comprises an impermeable end cap or collar.

22. A damp proof course article for forming a damp proof course in a substrate, the damp proof course article comprising an absorbent member and a damp proof course material absorbed into the absorbent member, the damp proof course material comprising an active agent, wherein the active agent comprises a combination of an octyltriethoxysilane and one or more of an alkoxysilane selected from a propylalkoxysilane, a butylalkoxysilane, a dodecylalkoxysilane, and a hexadecylalkoxysilane, including release control means for controlling release of the damp proof course material from the absorbent member, wherein the release control means reduces the surface porosity of at least one region of the absorbent member relative to the porosity of the remainder of the absorbent member, and wherein the release control means comprises spacing means on the, or each, region of the absorbent member, wherein the spacing means is configured to space the, or each, region of the absorbent member from a side of a drilled hole in the substrate.

\* \* \* \* \*